(12) United States Patent
Hallman

(10) Patent No.: US 8,151,470 B2
(45) Date of Patent: Apr. 10, 2012

(54) APPARATUS AND METHOD FOR ALLEVIATING ICE FREEZE-UP OF VEHICLE WINDOWS

(76) Inventor: John Dennis Hallman, Punxsutawney, PA (US)

( * ) Notice: Subject to any disclaimer, the term of this patent is extended or adjusted under 35 U.S.C. 154(b) by 1466 days.

(21) Appl. No.: 11/186,649

(22) Filed: Jul. 21, 2005

(65) Prior Publication Data

US 2007/0017051 A1  Jan. 25, 2007

(51) Int. Cl.
*B25D 3/00* (2006.01)
(52) U.S. Cl. .......................................... 30/167
(58) Field of Classification Search .................. 30/167; 15/236.01, 236.02
See application file for complete search history.

(56) References Cited

U.S. PATENT DOCUMENTS

| | | | |
|---|---|---|---|
| 1,803,006 A * | 4/1931 | Davis | 294/7 |
| 2,674,005 A * | 4/1954 | Simon | 15/105 |
| 3,214,834 A * | 11/1965 | Bell | 30/169 |
| 3,340,750 A * | 9/1967 | Noorlun | 81/15.9 |
| 3,562,826 A * | 2/1971 | Vaughn | 7/105 |
| 3,964,161 A * | 6/1976 | Wise | 30/142 |
| D255,209 S * | 6/1980 | Pavlak | D32/51 |
| 4,628,300 A * | 12/1986 | Amato | 340/542 |
| 4,819,531 A * | 4/1989 | Lawhon | 83/56 |
| 4,873,897 A * | 10/1989 | Williams | 81/15.9 |
| 5,104,094 A * | 4/1992 | Womack | 254/104 |
| D344,665 S * | 3/1994 | Baker | D8/88 |
| 5,440,811 A * | 8/1995 | Challis | 30/169 |
| 5,440,954 A * | 8/1995 | Stevens | 81/15.9 |
| D388,671 S * | 1/1998 | Suganami | D8/14 |
| D406,022 S * | 2/1999 | Wu | D8/14 |
| 5,988,712 A * | 11/1999 | Segelin | 292/346 |
| 6,000,091 A * | 12/1999 | Bauer | 15/236.02 |
| 6,131,290 A * | 10/2000 | Chiou | 30/169 |
| 6,364,289 B1 * | 4/2002 | Cook | 254/104 |
| RE38,093 E * | 4/2003 | Chiou | 30/169 |
| 6,920,807 B2 * | 7/2005 | Bond | 81/45 |
| 6,994,322 B1 * | 2/2006 | Wittman | 254/131 |
| 7,036,199 B1 * | 5/2006 | Hicks | 29/275 |
| 7,040,203 B1 * | 5/2006 | Chistiano | 81/488 |
| 2005/0223567 A1 * | 10/2005 | Cobb et al. | 30/339 |

* cited by examiner

*Primary Examiner* — Maurina Rachuba
(74) *Attorney, Agent, or Firm* — Carothers and Carothers

(57) ABSTRACT

To alleviate ice freeze-up of vehicle windows which incorporate spaced upper and lower seals which engage an outside surface of the vehicle window, a tool is provided with a handle and a blade extending from the handle and the blade has a bend and a distal end which is curved outwardly in the plane of the blade. The length of the blade segment between the bend and its distal end is selected to be slightly longer than the distance between the upper and lower seals whereby this blade segment may be inserted between the window outside surface and the upper and lower seals and then slid along the window to sever any ice seal existing between the outside window surface and the upper and lower seals to free up the frozen vehicle window for normal operation.

2 Claims, 4 Drawing Sheets

APPARATUS AND METHOD FOR ALLEVIATING ICE FREEZE-UP OF VEHICLE WINDOWS

BACKGROUND OF THE INVENTION

The present invention relates to hand tools and more particularly to a spatula like hand tool and method for alleviating ice freeze-up of vehicle windows.

When motor vehicles sit outside during the cold winter months, the manually operated or electrically operated vehicle windows become frozen. This is due to the fact that the rain and snow experience freeze and thaw cycles in the winter and the elastic window seals become frozen to the window and thereby prevent the window from operating up and down. The situation is exaggerated because on all modern day automobiles a double seal arrangement is employed to engage the window. There is an outer or upper seal which is readily visible, however, spaced underneath this upper seal is a parallel running lower seal which also engages the window and the public is not generally aware of this arrangement. This lower seal not only seals but also serves as a guide for the window. This lower seal also freezes to the window.

Accordingly it is a common experience that when one uses a knife or some other type of implement to separate the upper frozen seal from the window, the window still does not operate and it is not understood by the person undertaking the task because they do not understand that there is also a lower guide seal that is also frozen to the window.

It is a principal object of the present invention to provide a tool for alleviating the ice freeze-up of a vehicle window which incorporates such upper and lower seals and to further provide a method for doing so.

SUMMARY OF THE INVENTION

The present invention provides an apparatus and method for alleviating ice freeze-up of vehicle windows which incorporate upper and lower door seals that engage in outside surface of the window. In accordance with the teachings of the present invention a tool is provided with a handle and a blade extending from the handle. The blade has a bend in it and the distal end of the blade is curved outwardly in the plane of the blade. The length of the blade segment between the bend and the distal end is selected to be slightly longer than the distance between the upper and lower seals so that this blade segment may be inserted between the window outside surface and the upper and lower seals and drawn or slid therealong for the length of the window to sever any ice seal existing between the outside window surface and both the upper and lower seals. The bend of the blade is generally provided most desirably in the form of an obtuse angle.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF A PREFERRED EMBODIMENT

Figure 1:
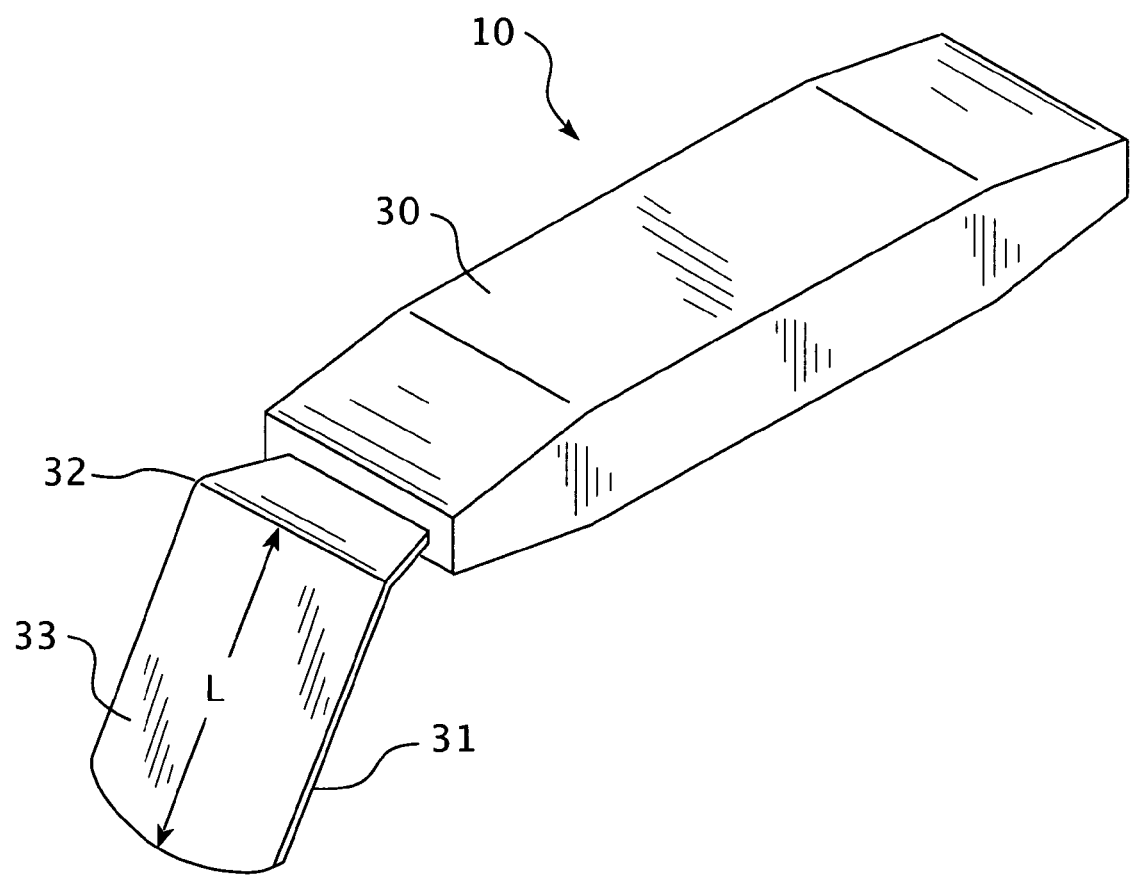
FIG. 1 is a perspective view of the tool of the present invention for alleviating ice freeze-up of vehicle windows.
Figure 2:
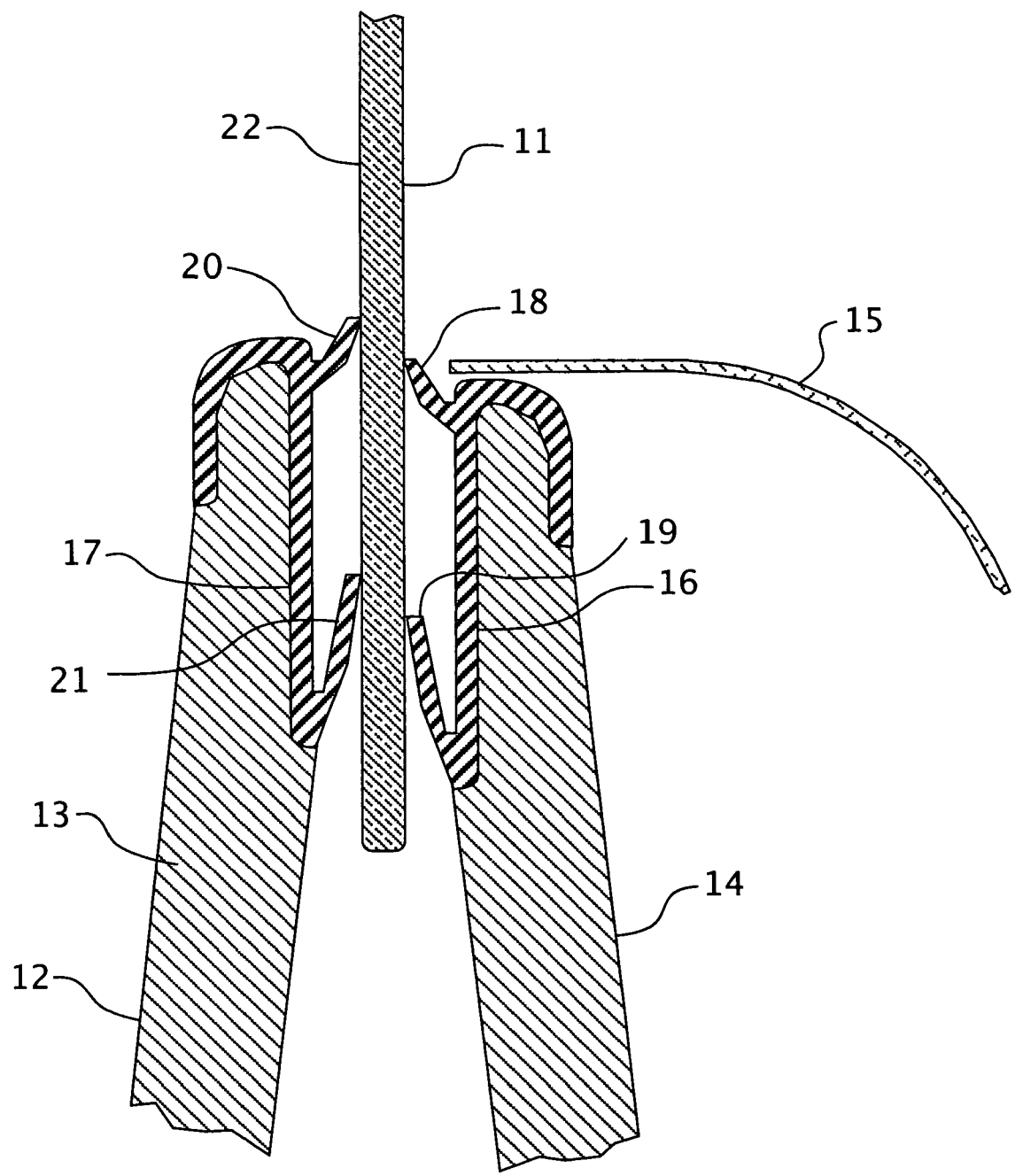
FIG. 2 is a schematic view in vertical mid cross section of a vehicle window and door combination.
Figure 3:
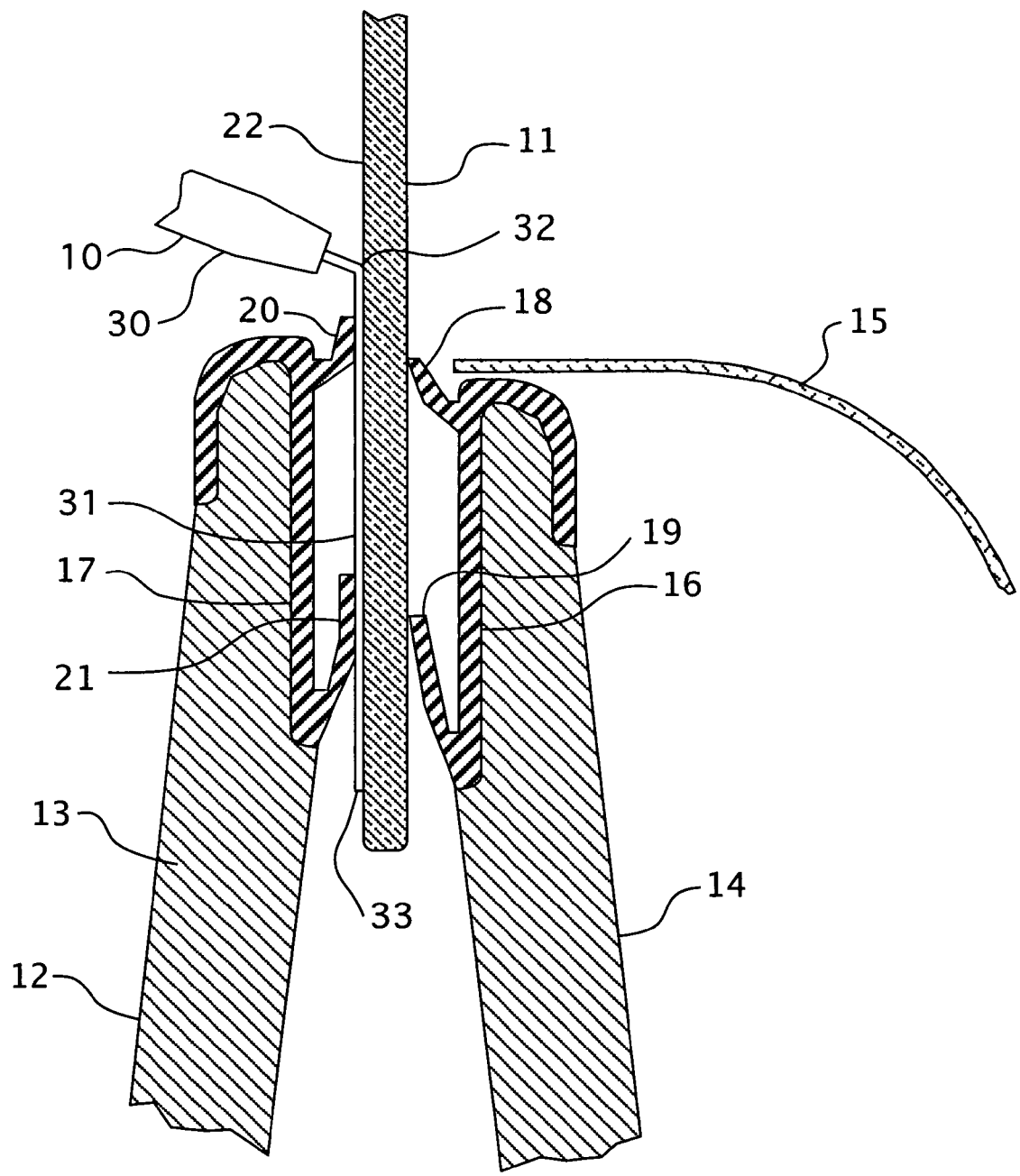
FIG. 3 is a view in vertical mid cross section of the vehicle window and door combination of FIG. 2 showing the tool of FIG. 1 in use.

Referring first to FIGS. 1, 2 and 3, the tool 10 of the present invention is provided for alleviating ice freeze-up of vehicle windows which incorporate spaced upper and lower door seals which engage an outside surface of the window as illustrated in cross section in FIG. 2 and FIG. 3. In FIG. 2 and FIG. 3 a portion of the vehicle door is shown in mid cross section and therein is illustrated the vehicle window 11 which is driven up and down by a mechanism (not shown) which is either mechanical or electro mechanical inside of the door which is illustrated at 12. The vehicle door 12 includes an outside doorframe 13 and an inside doorframe 14 which is generally covered with an upholstery covering 15.

The window 11 is sealed relative to the door 12 by means of inside seal 16 and outside seal 17. These are rubber seals which may or may not have a felt-like exterior surface for sliding against the glass window 11. Interior seal 16 is provided with respective upper and lower seals 18 and 19, and outside seal 17 is also provided with respective upper and lower seals 20 and 21. Upper and lower seals 20 and 21 generally slide against the outside surface 22 of window 11 to seal out the elements.

However, during winter months in northern climates snow will build up on upper seal 20 and with thawing will melt and water will inevitably reach lower seal 21. Thereafter when a freeze again occurs, both upper and lower seals 20 and 21 become frozen to the outer surface 22 of window 11 and it is not possible to operate the window up and down with either an electric window operator or a manual operation.

Refer again to FIG. 1, the tool 10 includes a handle 30 and a blade 31 extending from handle 30. Blade 31 is provided with a bend 32 and the distal end 33 of blade 31 is curved outwardly in the plane of the blade. The length of the blade L between bend 32 and distal end 33 is selected to be slightly longer than the distance between upper and lower seals 20 and 21 as is illustrated in FIG. 3 which illustrates the blade 10 inserted between the outside surface 22 of vehicle window 11 and upper and lower seals 20 and 21.

The bend 32 is an obtuse angle which provides the greatest ease for manipulating the tool and inserting the blade 31 down into the vehicle door 12 between the outside surface 22 of window 11 and upper and lower seals 20 and 21 as illustrated in FIG. 3.

Figure 4:
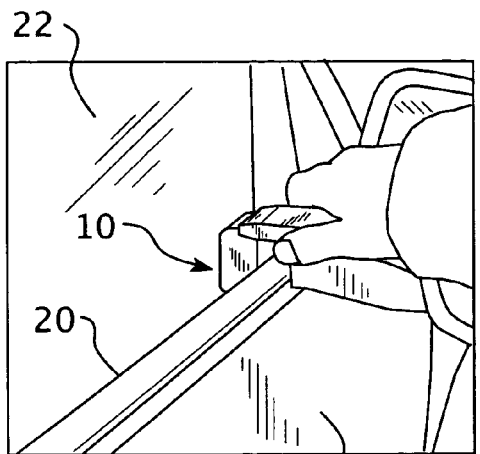
FIGS. 4 through 8 are perspective views illustrating the sequential application of the tool of the present invention for alleviating ice freeze-up of a vehicle window.
Figure 5:
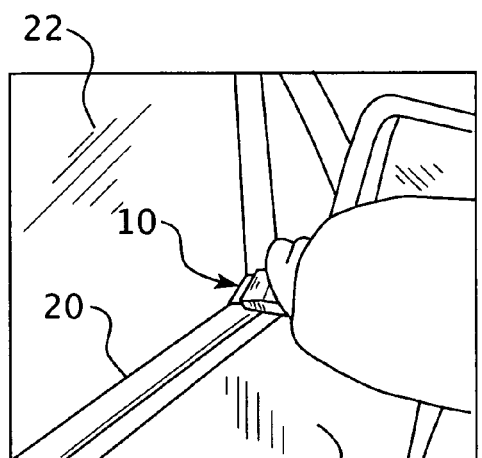
Figure 6:
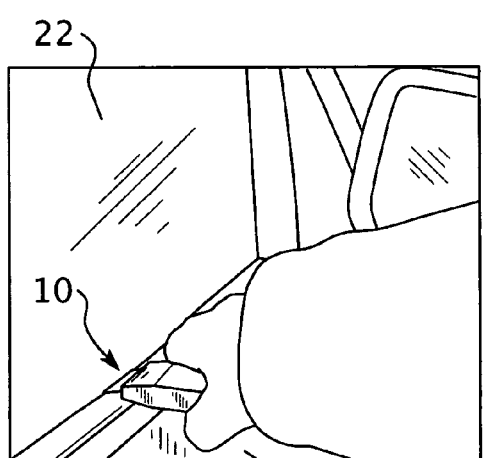
Figure 7:
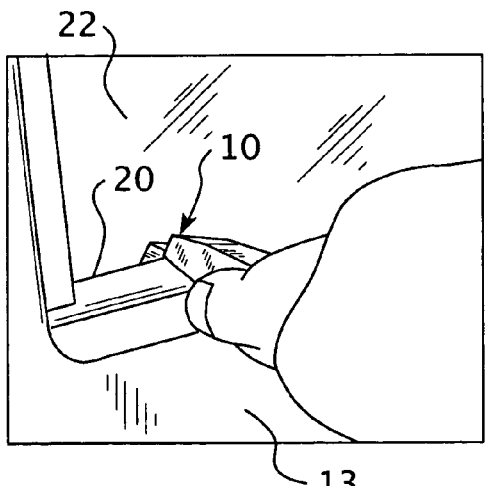
Figure 8:
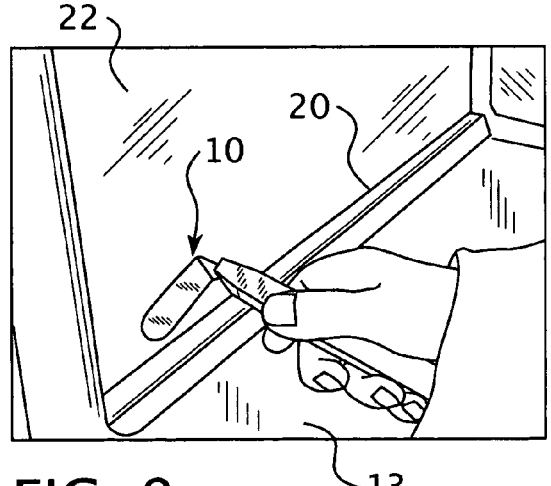

Referring next to the method sequence of the present invention, FIGS. 4 through 8 show in sequence the blade 31 is inserted between the vehicle window 11 and the upper and lower seals 20 and 21 and drawn therealong. The initial insertion is shown in FIG. 4 wherein the blade 31 is being inserted between the seals 20 and 21 and the window outer surface 22 at the forward portion of the vehicle window. After insertion as shown in FIG. 5 the operator begins to slide the blade rearwardly for the entire length of the window as further illustrated in FIGS. 6 and 7 and the blade 31 is then finally removed as shown in FIG. 8 at the rearward portion of the window. After this operation it will be found that the frozen window will now operate normally.

I claim:

1. A method for alleviating ice freeze-up of vehicle windows which incorporate spaced upper and lower door seals which engage an outside surface of said window, the method comprising;

providing a tool having a handle and a blade extending from the handle, said blade having a bend and a distal end which is curved outwardly in the plane of the blade, and a blade segment length between said bend and said distal end which is slightly longer than the distance between said upper and lower seals;

inserting said blade segment between said window outside surface and said upper and lower seals; and sliding said inserted blade segment for the length of said window to sever any ice seal existing between said outside window surface and said upper and lower seals.

2. The method of claim 1, wherein said bend is an obtuse angle.

* * * * *